UNITED STATES PATENT OFFICE.

WILLIAM H. BEERS, OF BROOKLYN, ASSIGNOR TO THE ASBESTOS FIRE PROOF BUILDING COMPANY, OF NEW YORK, N. Y.

FIRE-PROOF MATERIAL FOR BUILDING PURPOSES.

SPECIFICATION forming part of Letters Patent No. 241,281, dated May 10, 1881.

Application filed January 17, 1881. (No specimens.)

*To all whom it may concern:*

Be it known that I, WILLIAM H. BEERS, a citizen of the United States, residing at Brooklyn, in the county of Kings and State of New York, have invented a new and useful composition of matter by means of which a cheaper and more perfect fire-proof material to be used for building purposes is obtained, of which the following is a specification.

My invention consists in the use of lime, gypsum, borax, and sulphuric acid, in combination with ashes, to form fire-proof concrete for walls, partitions, roofs, ceilings, and floors, the material being rendered plastic by the addition of water; and said material may also be formed into blocks or slabs of any desired size or shape by molds for building purposes.

In using the above-named composition the dry ingredients, excepting the borax, must be thoroughly mixed with an equal proportion of ashes, sand, or other suitable material, or a larger proportion of ashes, sand, or other suitable material can be used, if desired. When about to be molded or used the mass is wetted with water, into which is put a sufficient quantity of sulphuric acid to give it the strength of common vinegar, and to which borax, in the proportion of two or three ounces to a gallon of water, has been added.

In the use of the above composition the formation of the concrete is largely promoted by the union of the acid and lime during its manufacture, producing a sulphate of lime, which is equally diffused throughout the mass, the result of the combination being an exceedingly tenacious, durable, and perfectly fire-proof material, which becomes stronger with age.

I am aware that prior to my invention various compositions have been patented for making artificial stone and for making cements to repair marble, &c.; but the ingredients forming such compositions are not claimed by me, broadly, as some of the ingredients entering into those compositions necessarily render them hard and brittle, which would defeat the object of the composition herein described and claimed.

What I claim, and desire to secure by Letters Patent of the United States, is—

The herein-described composition of matter to be used for forming fire-proof concrete or building blocks or slabs, consisting of lime, borax, gypsum, sulphuric acid, water, and ashes or sand, in the proportions specified.

WM. H. BEERS.

Witnesses:
J. WALTER HUNTLEY,
HARRY EDWARDS.